UNITED STATES PATENT OFFICE.

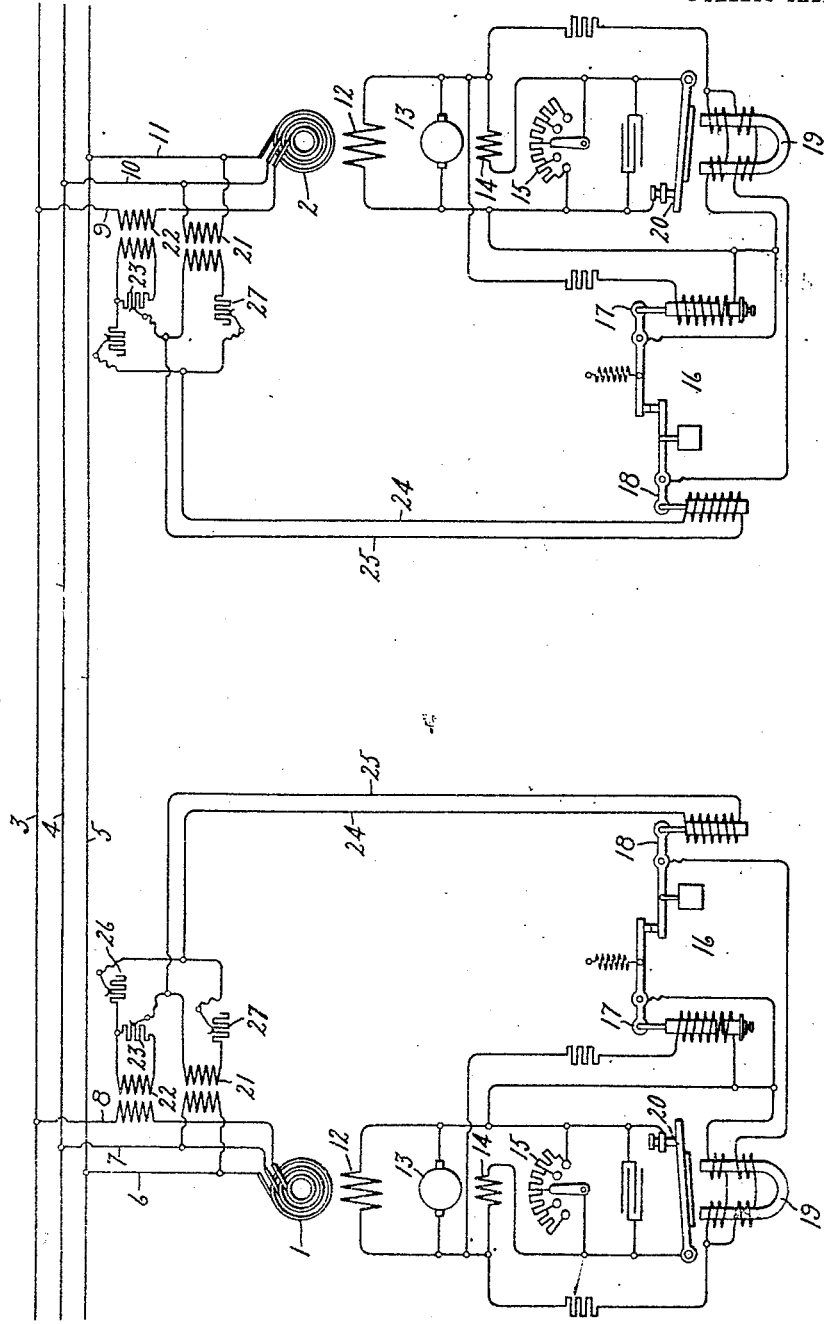

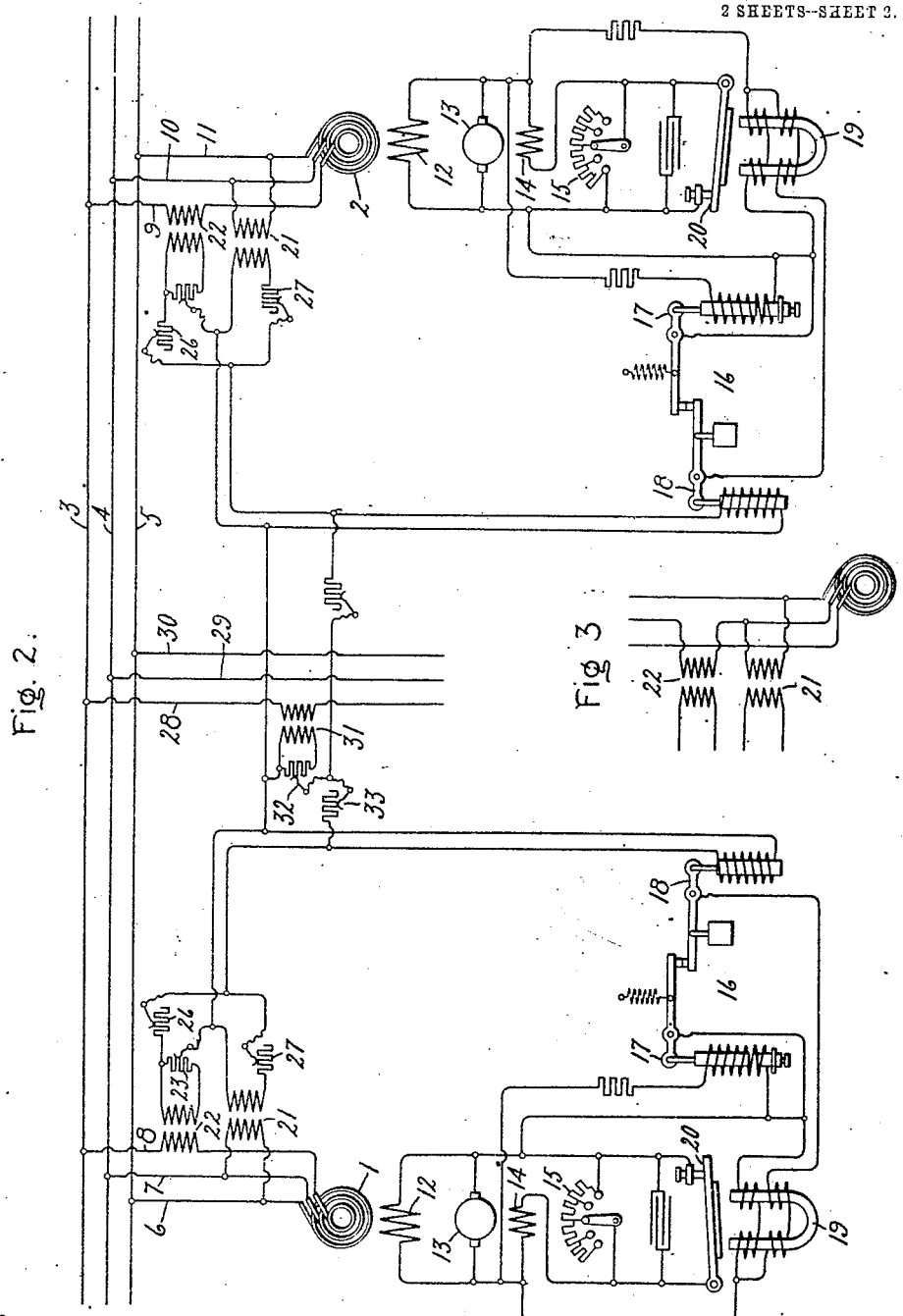

MAXIMILIAN PFEFFER, OF VIENNA, AUSTRIA-HUNGARY, ASSIGNOR TO GENERAL ELECTRIC COMPANY, A CORPORATION OF NEW YORK.

VOLTAGE-REGULATOR.

1,054,937. Specification of Letters Patent. Patented Mar. 4, 1913.

Application filed January 14, 1910. Serial No. 537,993.

*To all whom it may concern:*

Be it known that I, MAXIMILIAN PFEFFER, a subject of the Emperor of Austria-Hungary, residing at Vienna, Austria-Hungary, have invented certain new and useful Improvements in Voltage-Regulators, of which the following is a specification.

My invention relates to a system of automatically maintaining a predetermined distribution of load on a plurality of alternating current generators operating in parallel, the excitation of which is controlled by automatic potential regulators.

When a number of alternating current generators are operating in parallel, a phase displacement is apt to occur between the currents of the generators due to differences of excitation. When separate regulators are used for the separate generators, the operation is more or less indefinite. The terminal voltage can be maintained by all the regulators operating together, or by one, or a few doing all the regulation. If one regulator only does all the regulation, then the excitation of its generator only will be changed and its current, therefore, will be out of phase with the currents of the other generators, if they were in phase when the regulator began to act. Since the electrical and mechanical characteristics of the generators and the regulators cannot be identical, the regulation will usually be effected by one or a few regulators, giving inefficient operation, accompanied by the exchange of equalizing currents among the machines.

It is the aim of the present invention to bring about at all times a proper phase relation of the currents by making the regulator of each machine sensitive not only to changes of voltage but also to the changes of the phase angle between current and voltage in the armature leads of its particular machine.

In the accompanying drawings, Figure 1 illustrates my invention in its simplest form as applied to alternating current generators operating in parallel and controlled by Tirrill regulators; Fig. 2 illustrates a modified system in which the regulators are also influenced by changes of load on the system; Fig. 3 is a fragmental view showing the connections which are suitable when my invention is to be applied to a system operating with an inherently low power factor.

Referring to Fig. 1, the three-phase generators, 1, 2 are connected to the main busbars 3, 4, 5 by means of lead wires 6, 7, 8 and 9, 10, 11 respectively. Only two generators have been illustrated, but it will be understood that my invention is applicable to any number of generators operating in parallel. As the connections and arrangement of parts used with the generator 1 are exactly identical with those used with generator 2, it will suffice to explain my invention with reference to generator 1 only.

The generator is provided with a separately excited field 12 which is fed by means of an exciter 13. The shunt field 14 of the exciter is in series with a manually operated rheostat 15 which is periodically short circuited by the vibrations of the Tirrill regulator 16, in a well understood manner. The regulator consists of the usual direct magnet 17 connected across the exciter mains and the alternating current magnet 18, the connections of which will be explained presently. The vibrations of the magnets 17, 18 of the regulator periodically open and close the circuit of one of the differential windings of the relay magnet 19, which rapidly makes and breaks the contacts 20 in a shunt circuit around the resistance 15, thus inserting and withdrawing the resistance 15 in the field circuit of the exciter as is well understood.

The primary of the potential transformer 21 is connected across two of the generator leads 6, 7. The primary circuit of a current transformer 22 is in series with the third lead 8. An adjustable resistance 23 is connected across the secondary of the current transformer 22. The secondary of the current transformer is connected in series with an adjustable resistance 26, to the conductors 24, 25, leading to the winding of the magnet 18 of the regulator. The secondary of the potential transformer 21, in series with the adjustable resistance 27, is likewise connected to the lines 24, 25, in parallel with the secondary of the current transformer. This connection secures a 90° phase displacement between the secondary voltage of transformer 21 and the secondary voltage of transformer 22 whenever the currents in the generator leads are in phase with the voltage. The current in the magnet 18 is therefore due to the resultant, or rather average, of the two voltages of the potential and current transformers. If the current differs in phase from the voltage of the generator, then the two voltages of transformers 21 and 22 are not 90° apart, but more or less, depending whether the current lags or leads, and the resultant current, therefore, in leads 24, 25 is less or more than at unity power factor. Hence, with a lagging or leading current the regulator is caused to act, to raise or lower the field excitation of the exciter and thus in turn that of the generator. In practice the resistance 23 is so adjusted that the current from the transformer 22 amounts to only a small fraction of an ampere. The series resistance 26 and 27 make it possible to connect the secondaries of the transformers 21, 22 in parallel, thereby combining their currents and avoiding the necessity of using separate windings in the magnet 18.

With the arrangement and connection as above described, if the regulators are set to maintain an equal phase relation between the current and voltage of the machines, and the current of any machine tends to get out of phase, its regulator will be affected by the change of phase angle between the current and voltage in its generator leads, and it will act to raise or lower the excitation of its generator in the manner already described. For example, if one of the generators is overexcited, the resulting change of phase angle between its current and voltage will increase the current in the regulator magnet, in the above described manner, and lower the excitation of the generator.

Should it be desired for some reason to maintain a predetermined difference of phase between the generator currents, the regulators are initially set to maintain a predetermined difference of excitation, and will then regulate for a deviation from the predetermined excitation of any of the machines.

While the above system has been described only in connection with three-phase generators it will be understood that it can likewise be applied to a single phase system, the proper displacement of phase between the current and voltage being artificially produced by the combination of resistance and reactance, as is well understood in the art.

In the system illustrated by Fig. 2 the regulators are similarly affected by phase displacement of the currents thus tending to preserve equal phase relations, but in this case the regulator is likewise made responsive to an increase of load on the system to which the parallel connected generators contribute current. This is accomplished by placing a current transformer in one of the main line conductors 28, 29, 30,—in this case in conductor 28. Across the secondary of this current transformer 31 is placed an adjustable resistance 32. The secondary of this transformer is connected in parallel with the secondaries of transformers 21, 22 and in series with the resistance 33. The connection should be made in such manner that the transformer 31 will be in opposition to the transformer 22. Therefore, with a rising load on the main line the currents of transformer 31 and of the transformer in each of the generator leads may so combine, that the effect of the regulators will be to raise the excitation of the generators so as to give a constant terminal voltage at some distant point.

If my invention is to be applied to a system operating with an inherently low power factor, say below 0.75, I consider it advisable to place the primary of the current transformer 22 in one of the conductors to which the primary of the potential transformer 21 is connected; this is indicated in Fig. 3.

With a considerable phase displacement between the current and voltage in the generator leads, the two transformer voltages are not approximately 90° apart, as they would be at non-inductive load but are more nearly in phase. Any further change, therefore, in the phase of the current would not greatly change the resultant current in the main regulator magnet, and hence the regulator would be relatively sluggish. By shifting the current transformer into another lead and so shifting its current by 60° its voltage becomes approximately 90° displaced from the voltage of the potential transformer at this low power factor, and the regulator is rendered more sensitive for this kind of load.

What I claim as new and desire to secure by Letters Patent of the United States, is—

1. The combination of a plurality of alternating current generators connected in parallel, a voltage regulator for each of said generators, and means for making said regulators responsive to change of phase relation between the electromotive forces and the currents in the lines of their respective generators.

2. The combination of a plurality of alternating current generators connected in parallel, a voltage regulator for each of said generators, containing a main control magnet supplied with current, one component of which bears a fixed phase relation to the voltage across two of the phase legs, and another component of which bears a fixed phase relation to the current in one leg.

3. The combination of a plurality of alternating current generators operating in parallel, a voltage regulator for each of said generators, said regulator being responsive to changes of phase relation between voltage and current in the circuit of its own generator and to changes of current in the main line into which all the generators feed.

4. The combination of a plurality of alternating current generators connected in parallel, a voltage regulator for each of the said generators containing a main control magnet supplied with current, one component of which bears a fixed phase relation to the voltage of its generator armature, another component of which bears a fixed phase relation to the current of its armature and another component of which bears a fixed relation to the current in the main line into which all the generators feed.

In witness whereof, I have hereunto set my hand this 20th day of December, 1909.

MAXIMILIAN PFEFFER.

Witnesses:
 AUGUST FUGGER,
 ROBERT W. HEINGARTNER.